No. 786,377. PATENTED APR. 4, 1905.
F. C. OSBORN.
CASH REGISTER.
APPLICATION FILED AUG. 24, 1895.
8 SHEETS—SHEET 1.
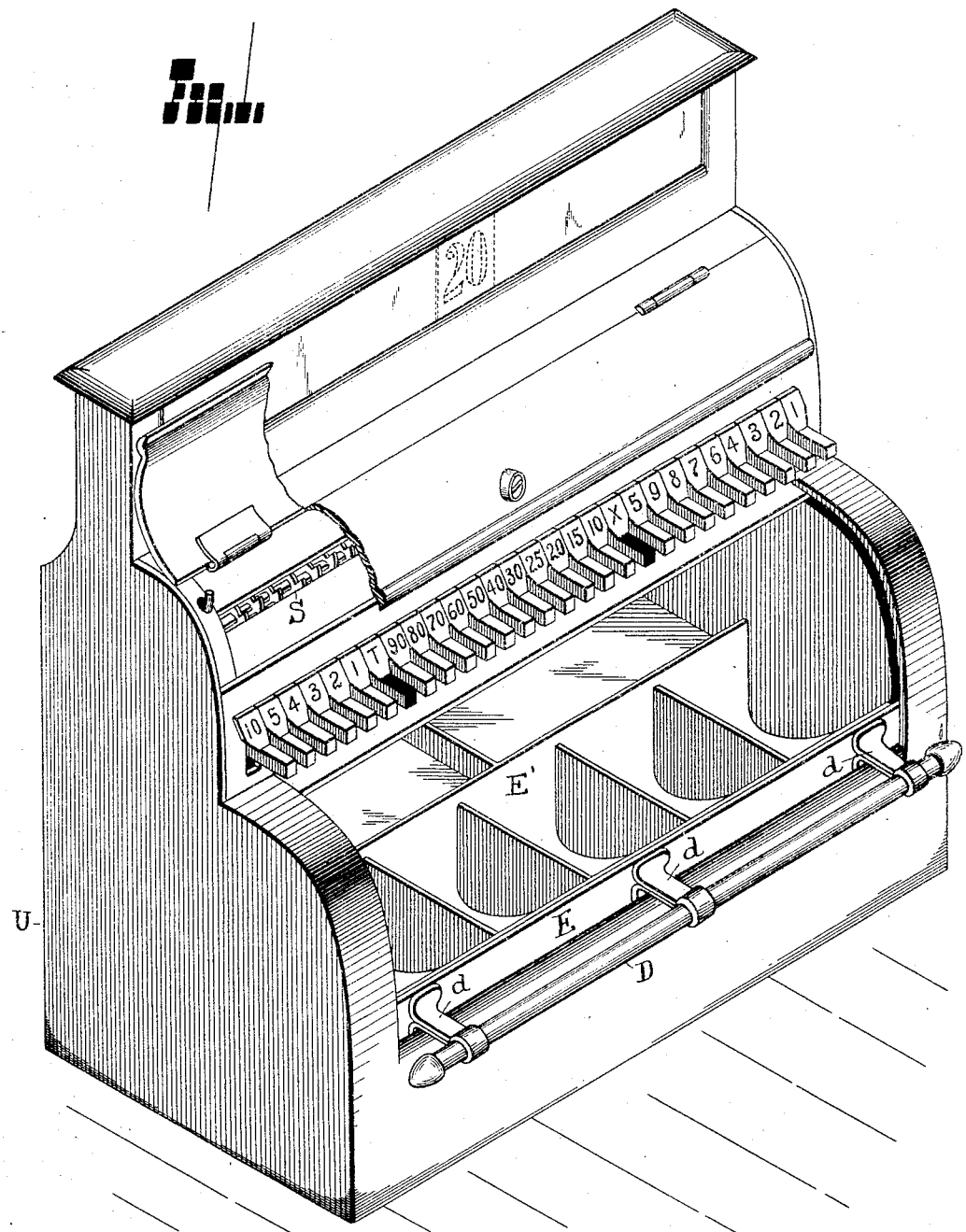
WITNESSES:
INVENTOR
Francis C. Osborn
by his Attorneys
Dyer & Driscoll

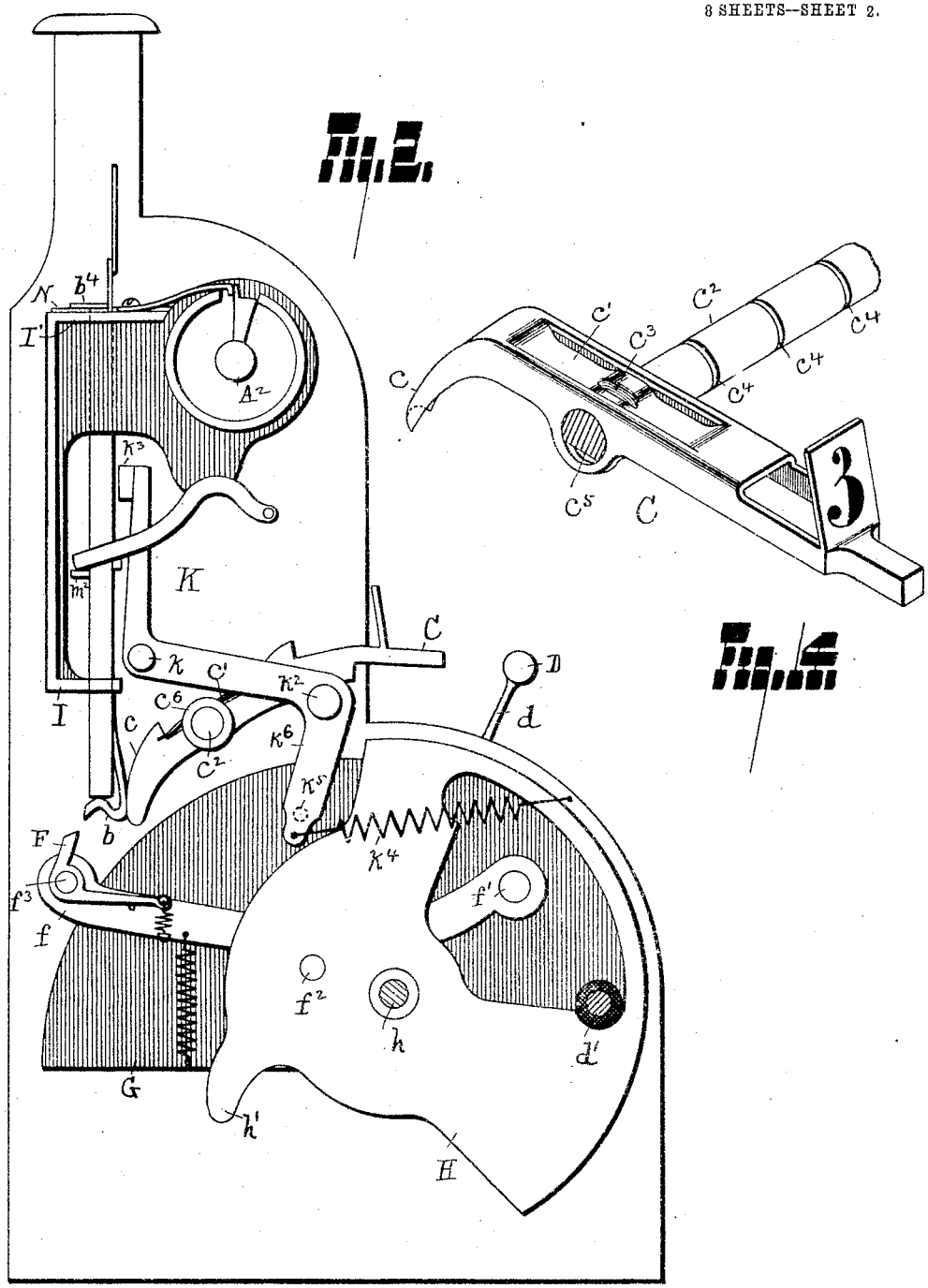

No. 786,377. PATENTED APR. 4, 1905.
F. C. OSBORN.
CASH REGISTER.
APPLICATION FILED AUG. 24, 1895.
8 SHEETS—SHEET 3.
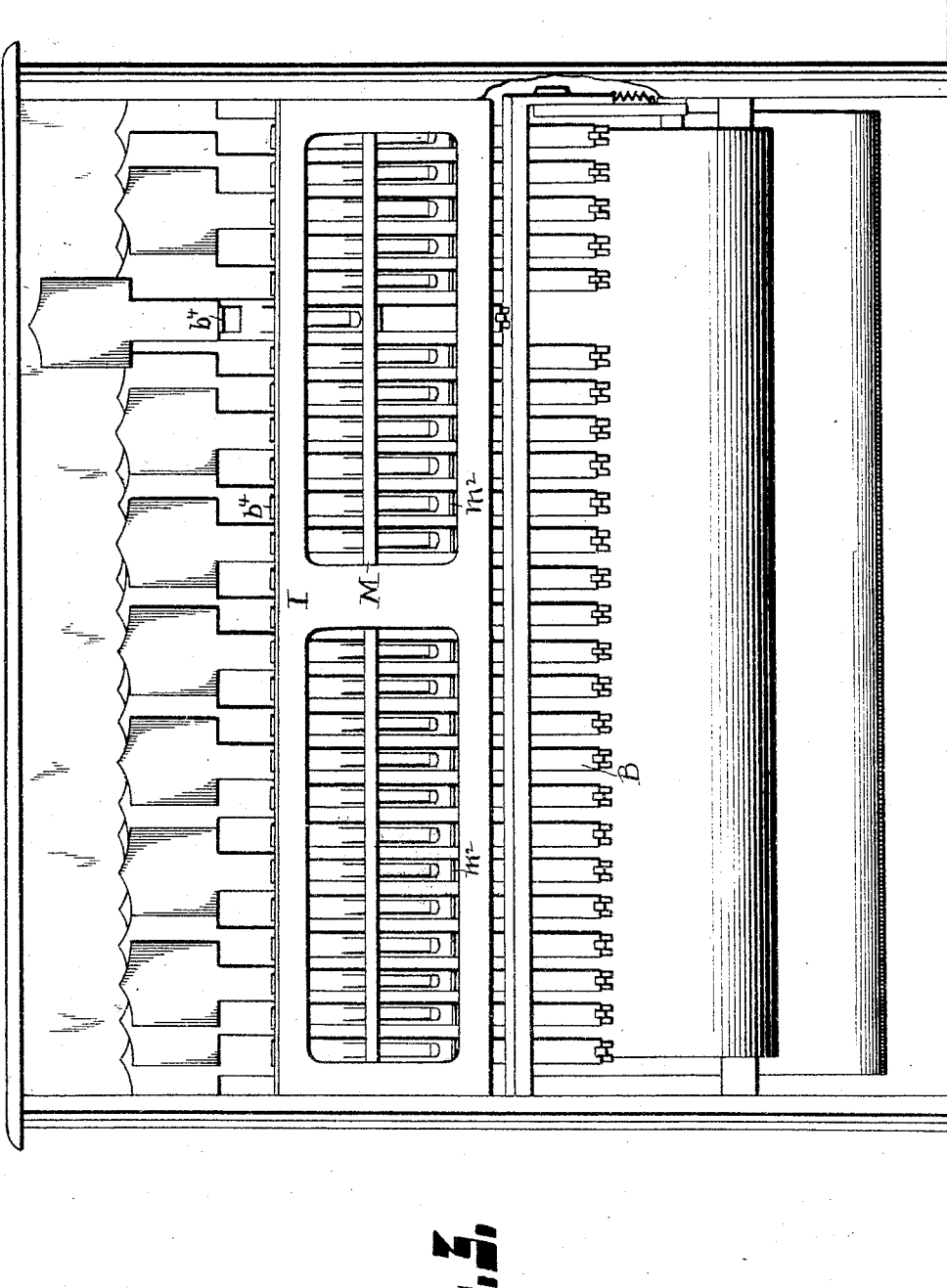
WITNESSES
INVENTOR

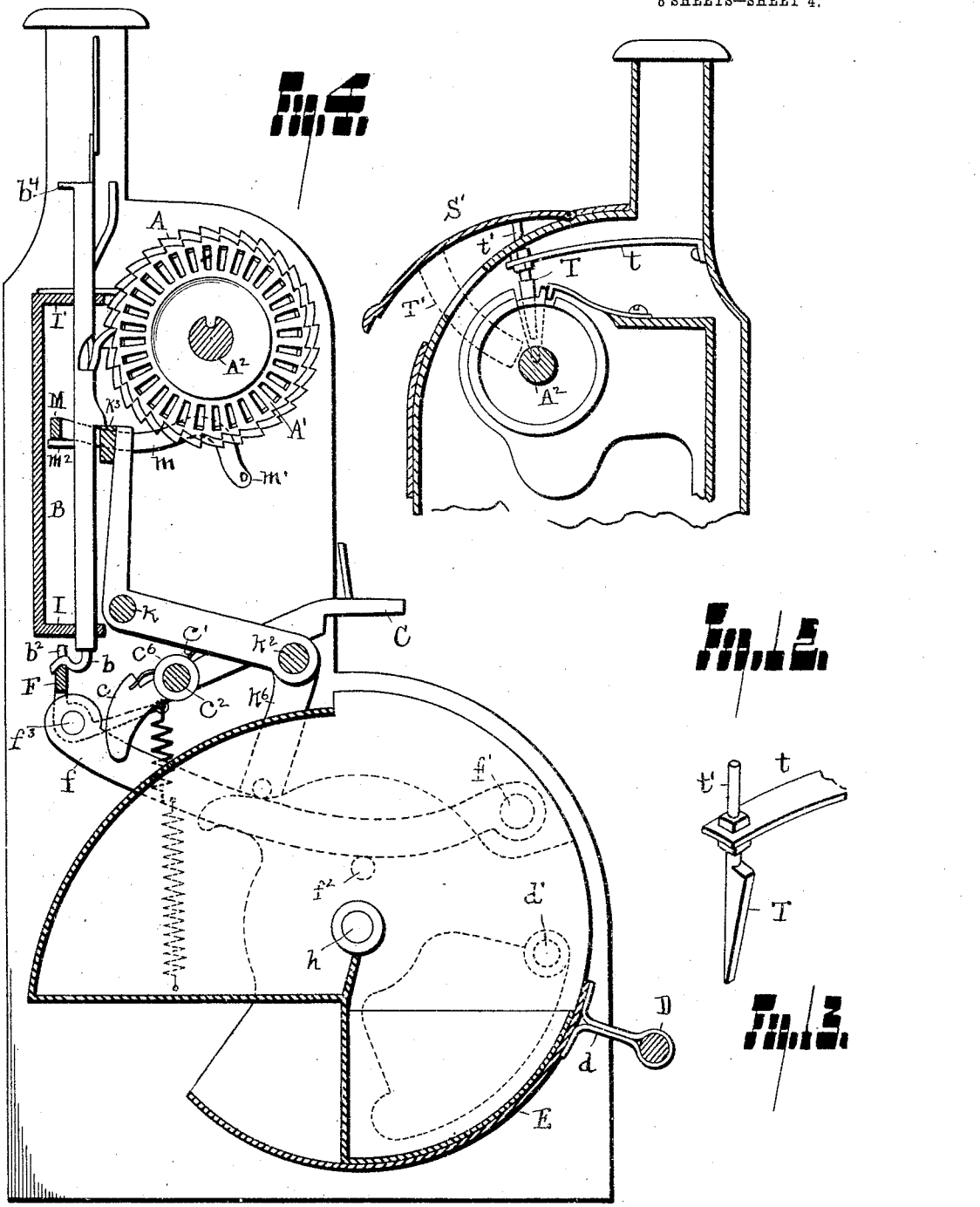

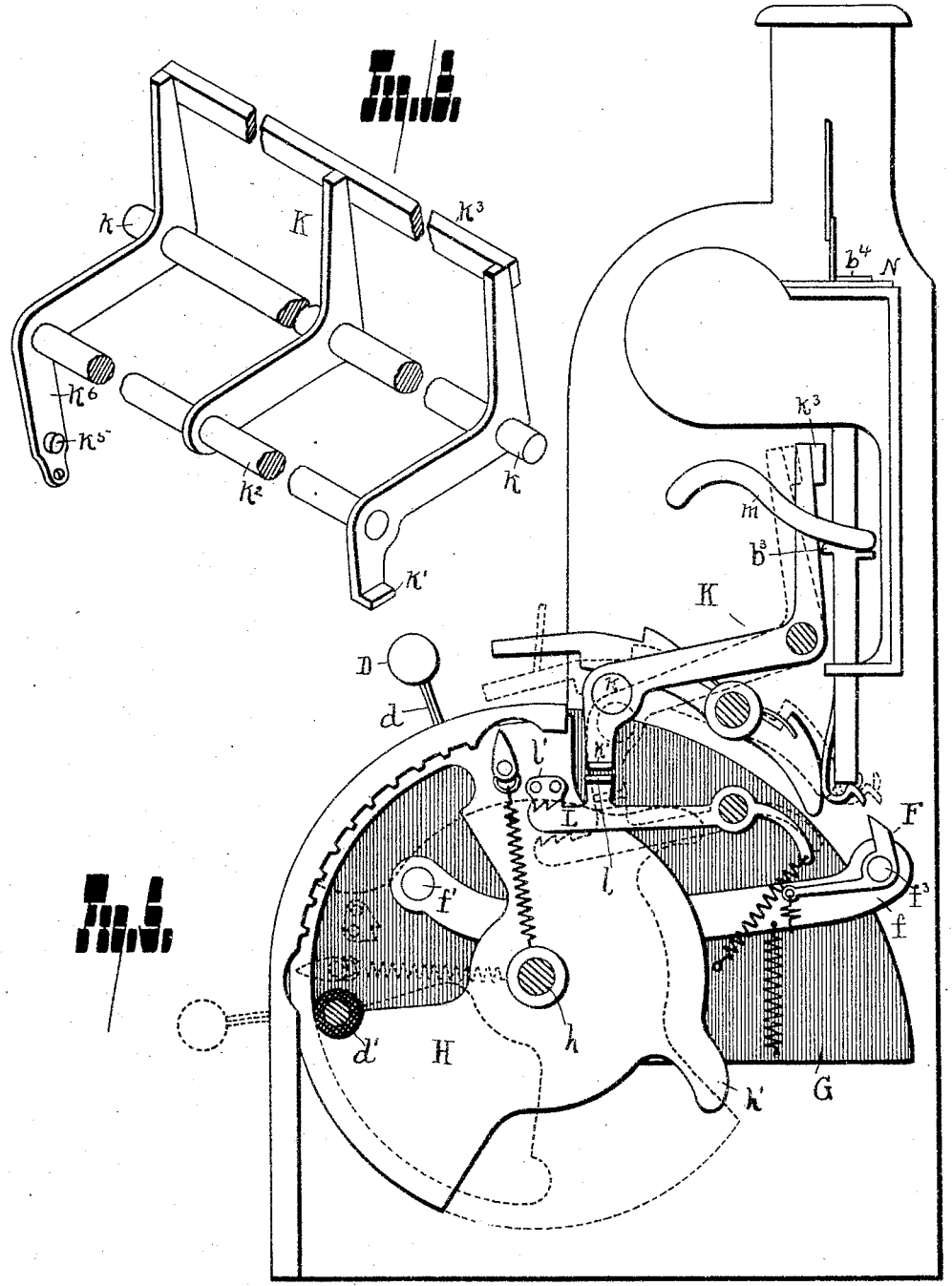

No. 786,377. PATENTED APR. 4, 1905.
F. C. OSBORN.
CASH REGISTER.
APPLICATION FILED AUG. 24, 1895.
8 SHEETS—SHEET 6.
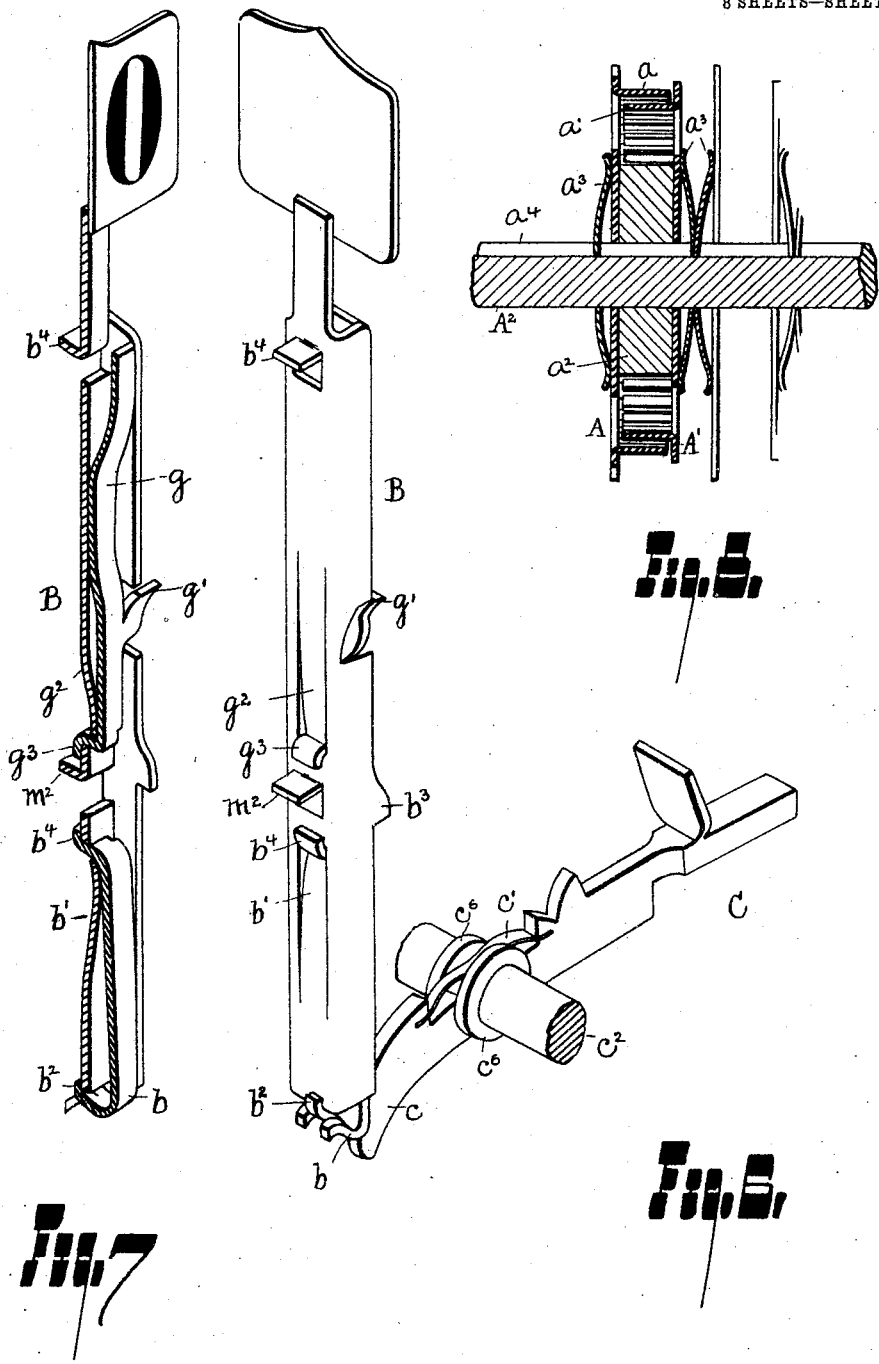

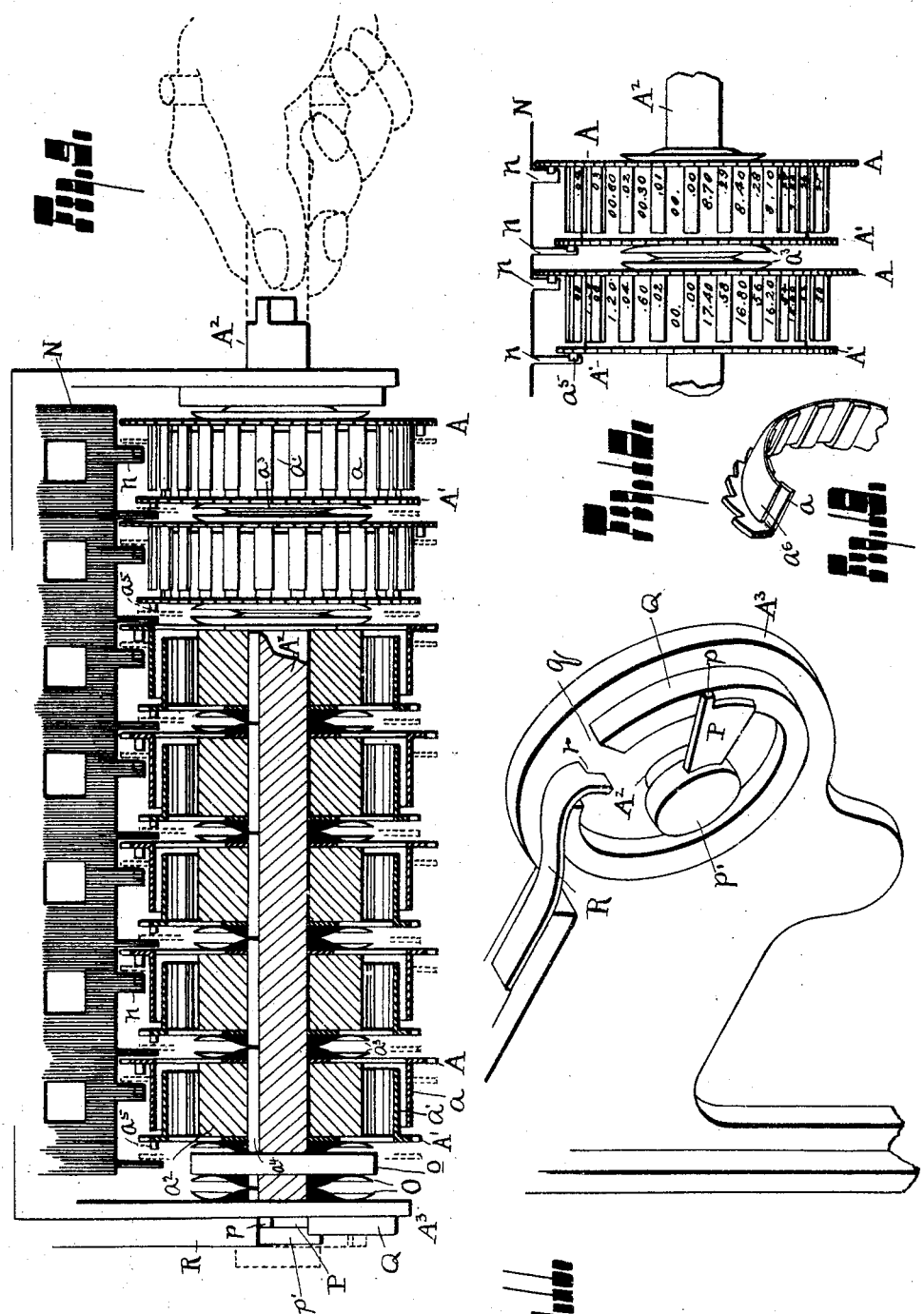

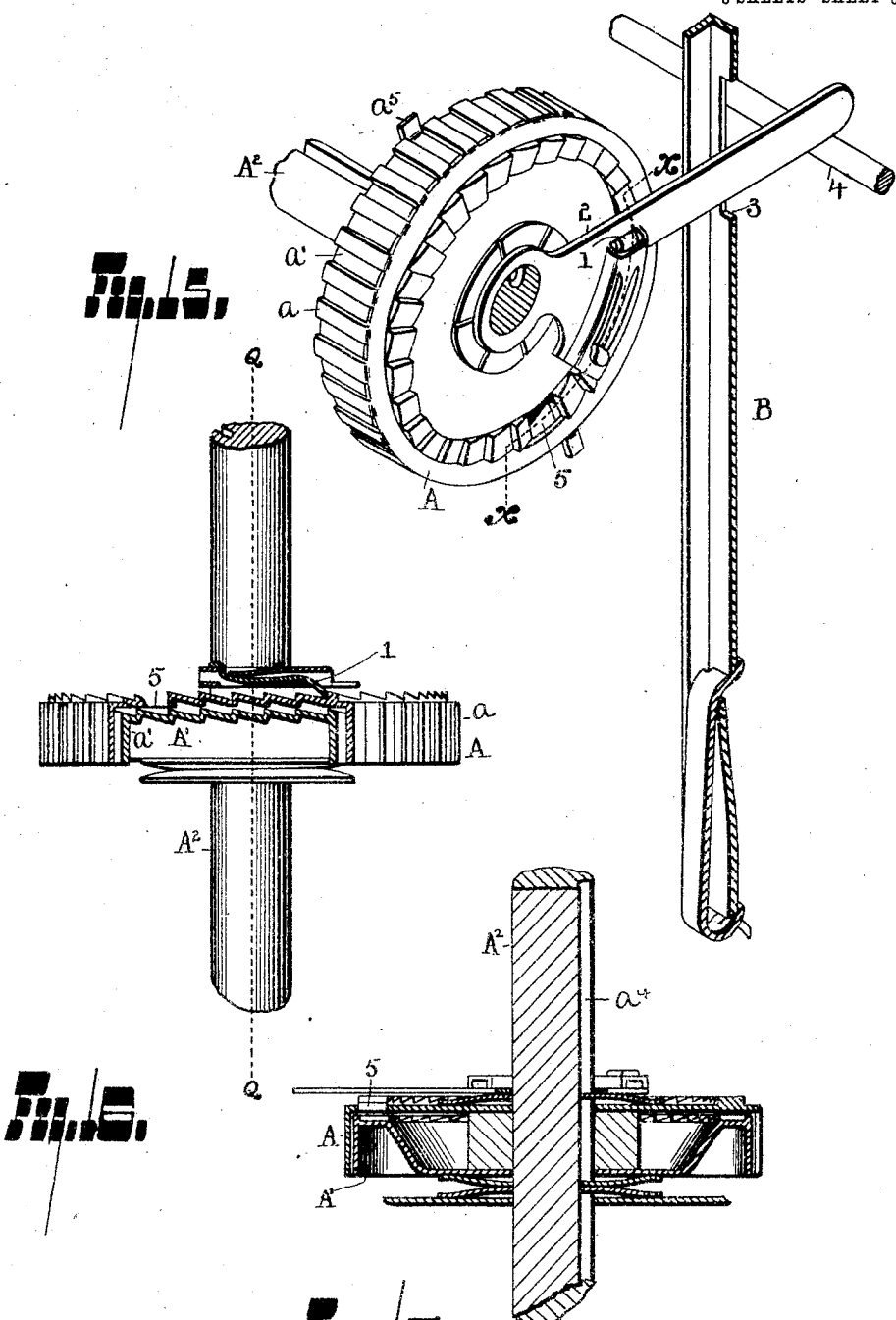

No. 786,377.

Patented April 4, 1905.

UNITED STATES PATENT OFFICE.

FRANCIS C. OSBORN, OF DETROIT, MICHIGAN, ASSIGNOR, BY MESNE ASSIGNMENTS, TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 786,377, dated April 4, 1905.

Application filed August 24, 1895. Serial No. 560,326.

*To all whom it may concern:*

Be it known that I, FRANCIS C. OSBORN, a citizen of the United States, residing at Detroit, in the county of Wayne and State of Michigan, have invented a certain new and useful Improvement in Cash-Registers, of which the following is a specification.

This invention relates to that class of cash-registers in which figured tablets are employed to indicate the sales and numbered registering-wheels are employed as a record of all sales so indicated, and particularly to that class of cash-registers known as "detail-adders."

The objects of my invention are to simplify the construction, reduce the size of the machine, and especially to reduce the cost of manufacture by forming the various duplicate parts in such a manner that they may be stamped from sheet metal.

The general principles of construction set forth in Patent No. 491,022, issued to me, and in my applications Serial Nos. 412,791 and 535,986 have been followed in the present machine.

In the accompanying drawings, Figure 1 is a perspective view of the machine, showing the till-cover open and a portion of the register-cover open; Fig. 2, an elevation of the left-hand end of the machine with the supporting end plate removed; Fig. 3, a rear elevation; Fig. 4, a vertical cross-section showing the relative position of the parts when the till-cover is open and a tablet-rod elevated; Fig. 5, an elevation of the right-hand end of the machine with the supporting end plate removed; Fig. 6, a perspective view of a tablet-rod and its operating-key; Fig. 7, a perspective view and partial section of a tablet-rod. Fig. 8 is a section of a registering-wheel, showing its construction and method of mounting on the wheel-shaft. Figs. 9 and 11 show the mechanism for resetting the register-wheels to zero; Fig. 10, a front elevation of two registering-wheels, showing the arrangement of the figures on the faces of the wheels. Figs. 12 and 13 show the locking mechanism for the register-shaft. Fig. 14 is a perspective view of an operating key-lever made from one piece of sheet metal. Fig. 15 is a perspective view of a modified form of register-wheel, its operating-pawl, and lever, and a perspective view and partial section of its tablet-rod; Fig. 16, an elevation and partial section of the wheel shown in Fig. 15, the same being taken on the line $x\ x$ of Fig. 15; Fig. 17, a vertical cross-section of same on the line Q Q of Fig. 16; Fig. 18, a perspective view of the rocking frame by which the till-cover is released upon the operation of a key-lever and by which the tablet-rods are held in an elevated position; and Fig. 19 is a perspective view of part of an inner register-wheel, showing the manner of mounting a continuous number-band.

The registering mechanism is what is known as a "detail-adder." It consists of an independent set of register-wheels for each indicator or key. In a machine of this character at least two wheels are necessary for each indicator or key, two, A and A', being employed in this machine, and for convenience of reference they will hereinafter be referred to as the "primary" and "secondary" wheels, respectively.

Heretofore in detail-adder machines the primary and secondary wheels were usually journaled on separate shafts, and a projecting lug on each primary wheel engaged with a tooth of a secondary wheel to move it one step at each complete revolution of the primary wheel. In my present machine the wheels are all on one shaft, $A^2$, and are provided with ratchet-teeth on their peripheries, with which operating-pawls engage. The secondary wheels are preferably smaller in diameter than the primary wheels, and each primary wheel is provided with one deep tooth, so that when the operating-pawl of a primary wheel drops into the deep tooth the pawl for its secondary wheel will engage a tooth of that wheel and both wheels will rotate. Thus the secondary wheels are rotated the distance of one tooth for each complete revolution of the primary wheels. The operating-pawls for this purpose are preferably made so as to move together and the same distance, or, if desired, one broad pawl may be employed which will be wide enough to engage both wheels. The deep tooth of each primary wheel is so arranged with relation to its operating-pawl that when the zero-point of the primary wheel is the next space to be exposed the deep tooth will be the one with which the pawl engages for that movement, and the pawl will then engage the adjacent tooth of the secondary wheel and both wheels will be moved. The number of character-bearing flanges $a$ and $a'$ of the two wheels A and A', respectively, are upon opposite sides of the wheels, and the secondary-wheel flange is enough smaller in diameter to telescope loosely into the flange of the primary wheel. The spaces between the numbers on the flange of the primary wheel are cut away so as to expose the numbers on the flange of the secondary wheel, as shown in Fig. 10. Thus the two numbers representing the total registration of any pair of wheels can be read through one sight-opening S, Fig. 1. The numbers on the flange of the primary wheel of each set are progressive in multiples of the number borne by its respective tablet rod or key and are as many in number as there are ratchet-teeth on the wheel. This wheel is rotated the space of one tooth at each operation of its tablet-rod and key. The secondary wheel of each set is numbered progressively in multiples of the number which represents the total or highest number of its primary wheel and is rotated the space of one tooth whenever the primary wheel has made a complete revolution. For example, take the primary wheel which is operated by the "six-cents" key and say the wheel has thirty ratchet-teeth, the numbers will run thus: ".06," ".12," ".18," ".24," &c., up to "$1.74," and the next or thirtieth space is a blank or zero. On the thirtieth operation of the six-cents key the zero-space of the primary wheel will be exposed and at the same time the secondary wheel will be moved its first step, exposing the "$1.80" space. The next (the thirty-first) movement of the six-cents key will show ".06" on the primary wheel, indicating a total of one dollar and eighty-six cents, the secondary wheel remaining stationary. The spaces on the secondary wheel are marked "$1.80," "$3.60," "$7.20," &c., up to "$52.20," and the thirtieth space being a blank, as in the primary wheel. The further operation of the six-cents key rotates the primary wheel alone until it reaches the zero-point again, when both wheels are again rotated and the second space —"$3.60"— of the secondary wheel is exposed. It will be understood that at all times to get the total registered by each key the sums exposed by their respective primary and secondary wheels must be added together.

As above stated, the tablet-rods B and the register-wheels A and A' are operated by the joint action of the key-levers C and the handle-bar D, which is secured to the till-cover E.

The till-cover cannot be opened without depressing one of the key-levers, and the tablet-rods are so arranged that they cannot be elevated without placing them into operative relation with a lifting-bar F by means of the key-levers. To place the tablet-rods into operative relation with the lifting-bar, each rod is provided with a swinging foot $b$, which is pivoted to the rod and held by a spring $b'$ normally in the forward position shown in Figs. 2, 6, and 7. The forward movement of the foot is limited by the lug $b^2$ striking the rear wall of the tablet-rod. The foot of each tablet-rod is moved backward by the cam-shaped end $c$ of its key-lever C. The lifting-bar F, which engages with the feet $b$, is pivoted to two arms $f\,f$, which arms are pivoted to the side frames G at $f'$. The arms $f$ are raised by the pins $f^2$, carried by the side plates H of the till-cover, which is pivoted at $h$ to the side frames of the machine. The lifting-bar F is pivoted to arms $f$ at $f^3$ in order that it will work more freely and readily adjust itself to the feet $b$ as the tablet-rods are raised. The feet $b$ are held in their backward position (the position shown in Fig. 4) as the tablet-rods rise by the bar F entering the hollow part of the feet, as seen in Fig. 4. The mechanism for releasing the till-cover and permitting the operation of the machine will be hereinafter more fully described. Each tablet-rod near its upper end has pivoted to it a swinging lever $g$, having two pawls $g'$ adapted to engage with the primary and secondary register-wheels when the tablet-rod is elevated by the lifting-bar F. The lever $g$ is thrown forward by a spring $g^2$, and its forward movement is limited by the upper guide-plate I', Fig. 4. Each of these levers is curved, as shown in Figs. 4 and 7, so that as the tablet-rod moves up or down the pawl $g'$ will move gradually into or out of engagement with its register-wheel. The position of the tablet-rod shown in Fig. 4 indicates its elevated position and after it has moved its register-wheel the distance of one tooth. When the tablet-rod is lowered, the upper curved end of the lever $g$ coming into contact with the guide-plate I' withdraws the pawls $g'$ from engagement with the register-wheel.

K is a rocking frame pivoted to the frame of the machine by the pivot-rod $k$. This frame has a foot $k'$, adapted to engage with the shoulder $l$ of a catch L, pivoted to the frame of the machine, Fig. 5, and which catch engages with a suitable projection $l'$ on the side plate H of the till-cover to lock the same. The pivoted frame K has a rod $k^2$ passing underneath the key-levers C, and upon depressing any one of the key-levers this rod is forced downward, tilting the frame. Thus when a key-lever is depressed the till-cover is unlocked by the foot $k'$ striking shoulder $l$, and at the same time the foot $b$ of a tablet-rod is forced backward by the cam end $c$ of the key-lever to place its respective tablet-rod in operative position relative to the lifting-bar F, and as the till-cover is opened by drawing downward on the handle D the bar F is lifted, as above described, raising the tablet-rod and moving its register-wheel forward one tooth. A locking-bar $k^3$ is carried by the pivoted frame K, and as the finger $h'$ on side plate H of the till-cover strikes pin $k^5$ on the extension $k^6$ of frame K the frame is tilted back to its normal position and locks a tablet in its elevated position. A spring $k^4$ is connected to extension $k^6$ to hold the rod $k^2$ of frame K always against the under side of the key-levers or against the last one operated if not yet returned to its normal position by the complete opening of the till-cover. The finger $h'$ strikes the stud $k^5$ on the extension $k^6$ of the frame K when the cover E is near the end of its throw in opening it, so that the locking-bar $k^3$ will be thrown against the tablet-rods at the proper moment. The key-levers are frictionally held on their pivot-shaft $C^2$, preferably by springs $c'$, with sufficient friction to retain them in their depressed position when operated, the tension of spring $k^4$ being insufficient to overcome the friction, and thus a number of keys can be operated without the necessity of holding down each key until the registration is effected or the till opened. Furthermore, the friction at the bearings of the key-levers prevents them from dropping every time the cross-bar $k^2$ of the frame K is moved downward by the depression of one of the keys, which would happen if they were loosely pivoted on the shaft or rigidly connected thereto. In a machine of the character herein described it is necessary to hold or lock a key-lever in its depressed position until the lifting-bar F is brought into engagement with the selected tablet-rod, and by my simple way of frictionally mounting the key-levers I avoid the use of special devices for locking and releasing the key-levers. Each key-lever when operated is returned to its normal position by the action of opening the till-cover to raise a tablet-rod and operate its register-wheel. This action takes place when the finger $h'$, before referred to, strikes pin $k^5$ on the extension $k^6$, causing the rod $k^2$ of frame K to strike the key-lever depressed and raise it. Upon the next operation of a key-lever the rocking frame K is again tilted, withdrawing the locking-bar from engagement with the tablet-rod last elevated, whereby that rod is free to descend. To insure the descent of the tablet-rods, I provide a bar M, carried by arms $m$, which are pivoted to the side frames of the machine at $m'$. This bar rests on the lugs $m^2$ at the back of each of the tablet-rods and serves as a weight to force the tablet-rods downward when released by the locking-bar $k^3$. If desirable, this depressing-bar may be provided with a spring to force it downward. The tablet-rods B are provided with lugs $b^4$, which in the normal position of the tablet-rods rest on the upper guide-plate I' and limit their downward movement.

The till E', Figs. 1 and 4, is fixed, the upper front of which is open and the lower front part is curved, as seen in Fig. 4, and divided into coin-pockets. The rear half of the till has a shelf for bills and is closed by a curved top. The cover E is curved and fitted to work closely to the front bottom of the till. The handle D is secured close to the top edge of the cover E by suitable brackets $d$. The movement of the cover in both directions is limited by the stops $d'$, Figs. 2 and 5, which are secured to the side plates of the till or the side frames of the machine and project into the opening formed in the side plates H of the till-cover. The stops $d'$ are covered by pieces of rubber tubing or other soft material to reduce the jarring and noise when they strike at either end of the opening in plate H. To avoid the necessity of closing the till-cover entirely by hand, I provide springs $f^4$, connected between the side frames G and the two arms $f$, so that when the operator has started the till-cover in the direction of closing the springs will rotate it to its closed position. It will be necessary for the operator to move the cover a slight distance in closing, because when the cover is entirely open the pins $f^2$ are on the dead-center.

Any suitable mechanism—such as a two-way pawl and rack, for instance—may be employed to compel the full movement of the handle D in order to place the tablets in full view every time a key-lever is depressed, and such full movement will insure the operation of the register-wheels. A two-way pawl and rack is illustrated in Fig. 5. The rack 10 is fixed to the frame of the machine, and the pawl 11 is pivoted to the side plate of the till-cover, and a spring 12 is connected between one end of the pawl and a ring 13 on the pivot of the till-cover. The rack 10 at both ends is provided with a curved recess $10^a$, into which the pawl 11 projects. When the cover is moved to either open or close it, the edges $10^b$ of the rack strike the pawl and tilt it, allowing the cover to be moved with the pawl dragging over the rack. The notches in the rack being of less depth than the recesses $10^a$, the pawl cannot return to its normal position until the cover receives a full stroke. It will readily be understood that the cover when once started in one direction cannot be moved in an opposite direction, because the pawl cannot be forced over its pivotal center. Therefore the direction of movement of the cover cannot be changed unless a full stroke is given to it, so that the pawl reaches either recess $10^a$, when it is free to assume its normal position.

The register-wheel shaft $A^2$ is normally held from rotation, and the wheels A and A' are free to revolve thereon. Each pair of wheels has a block $a^2$ between them, Figs. 8 and 9, and these blocks are tightly fitted on the shaft, so that they remain stationary with the shaft. Between each set of wheels are two spring-disks $a^3$, which force the wheels against the blocks $a^2$. These spring-disks have lugs which enter a longitudinal slot $a^4$ in the shaft $A^2$, so that when the shaft is rotated the spring-disks will rotate with it, and through the frictional engagement of the wheels with the blocks $a^2$ and disks $a^3$ the register-wheels are also rotated when the shaft is rotated. This is to accomplish the resetting of the register-wheels to zero. The device for locking the register-wheel shaft against rotation will be described in connection with the resetting mechanism.

The mechanism for resetting the register-wheels to zero is shown in Figs. 9, 10, and 11. Each register-wheel is provided with a laterally-projecting lug $a^5$ near its periphery and so located that when the shaft is shifted by hand slightly endwise toward the left and rotated the lugs $a^5$ of all the wheels will come in contact with the projections $n$ on a plate N, placed on the upper guide-plate I'. If desired, the projections $n$ may be formed integral with the plate I'. The shaft is rotated until all the lugs $a^5$ are brought into alinement. This position of the wheels brings the number preceding the zero-point on each wheel at the sight-opening S, Fig. 1. The shaft is then allowed to shift longitudinally back toward the right to its normal position through the pressure of spring-disks O O, so that the lugs $a^5$ will escape the projections $n$, and the rotation is continued one step. This brings the zero-point of all the wheels to the sight-opening S.

The arm P, secured to a head $p'$ on the register-wheel shaft $A^2$ at its left-hand end, serves to hold the shaft locked against rotation by engaging with the end of a circular flange Q and to hold the shaft in its shifted position while it is being rotated, Fig. 11, to bring the wheels to zero. The flange Q is secured to or made integral with the bearing-plate $A^3$ of the shaft $A^2$ and is concentric with the register-shaft. This flange is cut away at $q$ sufficiently to admit the arm P and to permit a movement of one-thirtieth of a revolution of the shaft $A^2$ when the arm P is in the space $q$. The spring-disks O O, bearing against the bearing-plate $A^3$ and the collar $o$, fixed on the shaft, hold the register-shaft normally pressed toward the right, so that the register-wheels are in proper position to be acted upon by the registering-pawls on the tablet-rods and out of position to be affected by the projections $n$ on the plate N. As the shaft $A^2$ is shifted toward the left in resetting to zero, the arm P is moved out of locking engagement with the flange Q and rides upon its surface, as shown in Fig. 11, until the finger $p$ of the arm P comes into contact with the hooked end of the spring-arm R, which holds it from further rotation until the shaft, under stress of the springs O, is shifted to the right to its normal position. The hooked end of arm R is partially cut away at $r$, so that after the shaft is shifted to the right by springs O it can be rotated one step farther, or a thirtieth of a revolution, bringing all the wheels to the zero-point and the arm P against the end of flange Q, as shown in Fig. 2, which is its normal position. The dotted lines in Fig. 9 indicate the shifted position of the parts. The arm P is of such length that when it comes under the spring-arm R it raises it slightly, and as the finger $p$ passes from under the spring-arm at $r$ the end of the spring-arm drops behind it and prevents backward movement. The width of the spring-arm at its free end is sufficient to prevent the backward movement of the arm P both in its normal position and in its shifted position. The end of the register-wheel shaft at the right is adapted to receive a key for shifting and rotating it, as indicated in dotted lines in Fig. 9. A hole in the end plate of the outer casing opposite this end of the shaft permits this key to be put in place at any time, but the shaft is locked against longitudinal movement by the wedge T, Figs. 12 and 13, which is so located that it is placed and held in locking position by the cover S' for the sight-opening when this cover is closed. This wedge enters the space between the casing and arm P and prevents the shifting of the shaft $A^2$ while cover S' is closed. The wedge T is carried by a resilient arm $t$, secured to the rear casing, which acts to throw the wedge upward and out of engagement with arm P when cover S' is opened. A stud or shank $t'$, which may be integral with the wedge, is provided and with which the cover S' engages to move the wedge downward. Instead of supporting the wedge as described it may be located directly upon the cover as a fixed part thereof, as shown in dotted lines at T', Fig. 12. It will be understood that cover S' is provided with a suitable lock.

To facilitate the rapid production by machinery of the various parts which are duplicated a number of times in the same machine, I have so designed such parts as to admit of their being readily stamped from sheet metal. I will now describe the construction of such parts more in detail.

The tablet-rods B, Fig. 7, are in transverse section U-shaped, with the open side toward the front of the machine. The foot $b$ is stamped from sheet metal and one end is bent into an elbow $b^4$, which passes through the back of the tablet-rod and over the end of the spring $b'$, which forces the foot forward. The spring $b'$ is integral with the rod and is formed by cutting the back, as shown in Figs. 6 and 7. The pawl-lever $g$ is pivoted to the tablet-rod by an elbow $g^3$, similar to that of the foot $b$, and is pressed forward by the spring $g^2$, cut from the back of the rod-like spring $b'$. About midway of the lever $g$ are located the pawls $g'$, which are integral with the lever, and the sides of the tablet-rod are cut away, as shown, to permit the backward movement of the lever. The upper portion of the pawl-lever $g$ is bent outward and is so formed with relation to the guide-plate $I'$ that the pawls will be held out of engagement with the register-wheel teeth except during so much of the last part of the upward movement of the tablet as is required to move the wheels the space of one tooth. The lugs $b^3$, which engage with the locking-rod $k^3$, are integral with the sides of the tablet-rods. The lugs $m^2$, with which the depressing-bar M engages, are cut from the back of the tablet-rods, as shown in Figs. 6 and 7. The lugs $b^4$, which support the tablet-rods in their lowermost position, are also punched from the backs of the rods. The tablet itself may be a part of the tablet-rod and formed integrally therewith, instead of being mounted thereon, as shown.

The preferred construction of the key-lever is shown in Fig. 14. It is stamped from one piece of sheet metal, as is fully shown in the drawings. The spring $c'$, which holds it frictionally to its shaft $c^2$, is depressed sufficiently to partially envelop the shaft, and has a depression $c^3$, adapted to enter a groove $c^4$, cut in the shaft. This groove may be as wide as the spring, in which case the depression $c^3$ would not be necessary. These grooves, one for each key-lever, hold the keys accurately spaced and prevent frictional contact of one key with another. One side of the key-shaft may be flattened, as shown at $c^5$, Fig. 14, to facilitate the mounting of the keys thereon—that is to say, the key can be readily slipped on the shaft to proper position by holding the key so that the depressed part of the key forming the spring $c'$ is on the flattened side and when it reaches its proper position it is turned around to the position shown in Fig. 14. The spring $c'$ may be a separate piece and be inserted, as shown in Fig. 6, when the key-lever is of cast metal. In this case each key is provided with two hubs $c^6$, and a portion of the upper side of the key between the hubs is cut away so as to permit the spring to press upon the shaft.

The register-wheels are constructed with reference to economy of space, one being telescoped into the other, as heretofore described. The telescoping number-flanges $a$ and $a'$ are formed of separate strips cut out of the body of the wheel and bent up so as to form a series of arms, making a non-continuous flange at right angles to the side of the wheel near its periphery, as clearly shown in Figs. 4, 8, and 9. The registering figures are stamped into these flange-arms, preferably before the arms or strips are cut out or bent up. In order to make the numbers on the two wheels of contrasting colors, those of the inner wheel may be printed upon a continuous band of paper or thin metal $a^6$ and placed over the stamped flange-arms, as shown in Fig. 19.

In Figs. 15, 16, and 17 a modified form of register-wheel and operating-pawl is shown. In this construction the ratchet-teeth are stamped into the sides of the wheels and the number-flanges formed on the peripheries, the inner flange being continuous or not, as desired. This form of wheel is operated by a pawl 1, mounted upon an arm 2, which is pivoted upon the register-shaft and having its free end passing through a slot 3 in the tablet-rod at the other end. This slot in the tablet-rod is so adjusted in length and relation to the width and location of the arm 2 as to carry this arm, with the tablet-rod, in its upward movement a sufficient distance to move the register-wheel one notch and to bring the arm back to the stop-bar 4 as the tablet-rod reaches the limit of its downward movement. The outer or primary wheel A is cut away at 5 to permit the pawl 1 to engage a tooth of the inner or secondary wheel $A'$, also whenever the outer wheel has made a complete revolution. These wheels are mounted upon the shaft in a manner similar to that already described. The resetting to zero is accomplished in the manner already described, stud $a^5$ being the stud for engaging with the stops $n$.

All the operating parts except the depressing ends of the key-levers and their number-shields and the handle-bar H are inclosed by the casing U.

What I claim is—

1. In a cash-register, the combination of a vertically-movable tablet-rod, a lifting-bar by means of which the tablet is elevated, a pivoted foot carried by said tablet-rod and held normally out of the path of said lifting-bar by a spring, a pivoted key-lever whose inner end is adapted to engage with said foot to move it into the path of the lifting-bar, and an operative connection between said lifting-bar and the movable element of the till, whereby the tablet-rod is elevated in opening the till, substantially as set forth.

2. In a cash-register, the combination with a tablet-rod and a toothed register-wheel, of a spring-actuated pawl carried by the tablet-rod adapted to engage directly with the teeth of the register-wheel to rotate the same, a key-lever, a lifting-bar operated by means independent of the key-lever, and a device carried by the tablet-rod adapted to be moved by the key-lever into the path of the lifting-bar without shifting the tablet-rod, substantially as set forth.

3. In a cash-register, the combination with a tablet-rod and a toothed register-wheel, of a spring-actuated pawl carried by the tablet-rod adapted to engage directly with the teeth of the register-wheel to rotate the same, a key-lever, a lifting-bar for raising the tablet-rod, a device carried by the tablet-rod adapted to be moved by the key-lever into the path of the lifting-bar, and means actuated by the movable element of the till for operating said lifting-bar to move the tablet to indicating position and operate the register-wheel, substantially as set forth.

4. In a cash-register, the combination with a tablet-rod and a toothed register-wheel, of a spring-actuated pawl carried by the tablet-rod adapted to engage directly with the teeth of the register-wheel to rotate the same, a key-lever, a lifting-bar for raising the tablet-rod, a device carried by the tablet-rod adapted to be moved by the key-lever into the path of the lifting-bar, means actuated by the movable element of the till for operating said lifting-bar to move the tablet to indicating position and operate the register-wheel, and a locking-bar for holding the tablet in the indicating position, substantially as set forth.

5. In a cash-register, the combination with a tablet-rod and a toothed register-wheel, of a spring-actuated pawl carried by the tablet-rod adapted to engage directly with the teeth of the register-wheel to rotate the same, a key-lever, a lifting-bar for raising the tablet-rod, a device carried by the tablet-rod adapted to be moved by the key-lever into the path of the lifting-bar, and means actuated by a rotary till-cover for operating said lifting-bar to move the tablet to indicating position and operate the register-wheel, substantially as set forth.

6. In a cash-register, the combination with a tablet-rod and a register-wheel, of a device carried by the tablet-rod for rotating the register-wheel, a lifting-bar for raising the tablet-rod to expose the tablet and rotate the register-wheel, a device carried by the tablet-rod and operated by a key-lever to move it into the path of the lifting-bar, said lifting-bar being operated by the till-cover in opening the same, a locking-bar for holding the tablet-rod in its elevated position, a pivoted frame carrying said locking-bar and operated by a key-lever to release the tablet-rod on the downward movement of the key, and means for returning the locking-bar to its normal position to lock the tablet-rod last operated, substantially as set forth.

7. In a cash-register, the combination with a tablet-rod and a register-wheel, of a key-lever for placing the tablet-rod in position to be elevated, a catch for locking the till-cover, a pivoted frame having a locking-bar adapted to hold the tablet-rod in an elevated position, and a foot adapted to engage with the catch for locking the till-cover, said pivoted frame being operated in one direction by a key-lever to release the till-cover and in an opposite direction by the cover to throw the locking-bar into engagement with the tablet-rod, substantially as set forth.

8. The combination with a tablet-rod, a key-lever and the till, of an operative connection between said tablet-rod and till controlled by the key-lever, whereby the tablet-rod is elevated by the opening of the till, and a pivoted locking-bar for holding the tablet-rod in its elevated position, said bar being placed into locking position by the opening of the till, and out of locking position by the key-lever, substantially as set forth.

9. A set of register-wheels for cash-registers comprising two sheet-metal disks, each having ratchet-teeth stamped from the periphery thereof and provided with character-bearing flanges stamped from the body of the disk within the periphery, said flanges being arranged to telescope, and the outer flange being open at regular intervals to expose the characters on the inner flange, substantially as set forth.

10. In a register, the combination with a suitable frame having a recessed portion, of a longitudinally-movable shaft having an arm adapted to engage said recessed portion, registering-wheels mounted on said shaft and rotatable therewith, and a stop projection permanently situated in juxtaposition with reference to the recessed portion and adapted to be encountered by said arm when the arm is shifted from said recessed portion.

11. In a register, the combination with a suitable frame having a recessed portion, of a longitudinally-movable shaft, having an arm adapted to engage said recessed portion, registering-wheels mounted on said shaft and rotatable therewith, and a stop projection situated in juxtaposition with reference to the recessed portion and adapted to be encountered by said arm; with provisions for permitting a slight advance movement of said arm within said recessed portion.

12. In a register, the combination with a suitable frame having a recessed portion, of a longitudinally-movable shaft having an arm adapted to engage said recessed portion, registering-wheels mounted on said shaft and rotatable therewith, and a stop projection situated in juxtaposition with reference to the recessed portion and adapted to be encountered by said arm; with provisions for permitting a slight advance movement of said arm within said recessed portion but preventing subsequent retrograde movement of the same.

13. In a register, the combination with register-wheels, the register-shaft, the arm P carried by said shaft, the lug $p$ on said arm, the stationary recessed rim Q with which said arm engages, and the determining-stop R having the recess $r$ for the passage of said lug, substantially as set forth.

14. In a cash-register, the combination of a series of register-wheels arranged in pairs, a normally non-rotating shaft upon which said wheels are loosely mounted, spacing-blocks on said shaft between the wheels of each pair, and friction devices carried by said shaft between adjacent pairs or sets of wheels and adapted to rotate the wheels when the shaft is rotated to reset the wheels to zero, substantially as set forth.

15. In a cash-register, the combination of a series of register-wheels arranged in pairs and provided with telescoping character-bearing flanges, a normally non-rotating shaft upon which said wheels are loosely mounted, spacing-blocks on said shaft between the wheels of each pair, and friction devices carried by said shaft between adjacent pairs or sets of wheels and adapted to rotate the wheels when the shaft is rotated to reset the wheels to zero, substantially as set forth.

16. In a cash-register, the combination with a series of register-wheels, of a shaft upon which said wheels are loosely mounted, a locking device for normally holding said shaft against rotation, a lock for preventing the disengagement of said locking device, and means for releasing said locking device to permit the rotation of said shaft to reset the register-wheels to zero, substantially as set forth.

17. In a cash-register, the combination with a series of register-wheels, of a shaft upon which said wheels are loosely mounted, a locking device for normally holding said shaft against rotation, means controlled by the cover for the sight-opening for releasing the locking device and permitting the rotation of the shaft to reset the register-wheels to zero, substantially as set forth.

18. In a cash-register, the combination with a series of register-wheels, of a shaft upon which said wheels are loosely mounted, friction devices on said shaft and in frictional engagement with said register-wheels, a locking device for normally holding said shaft against rotation, and means for releasing said locking device to permit the rotation of the shaft and the register-wheels through the friction devices to reset the register-wheels to zero, substantially as set forth.

19. In a cash-register, the combination of a series of register-wheels, a cover for the opening through which the register-wheels are visible, a shaft upon which said wheels are mounted, said shaft being capable of endwise and rotary movement to reset the wheels to zero, means for locking said shaft against rotation, said means being disengaged by moving the shaft endwise, and means for locking said shaft against endwise movement, said means being disengaged by the opening of the cover for the sight-opening, substantially as set forth.

20. In a cash-register, the combination of a series of register-wheels, a cover for the opening through which the register-wheels are visible, a shaft upon which said wheels are mounted, said shaft being capable of endwise and rotary movement to reset the wheels to zero, an arm carried by said shaft and engaging with a flange to lock the shaft against rotation, said arm being disengaged by moving the shaft endwise, and a wedge for locking said shaft against endwise movement, said wedge being disengaged by the opening of the cover for the sight-opening, substantially as set forth.

21. A key-lever for cash-registers having a U-shaped body portion adapted to be pivoted upon a shaft, an inner end adapted to engage with a tablet-rod, a depressing end and a character-bearing plate, all stamped and shaped from one piece of sheet metal, substantially as set forth.

22. In a cash-register, the combination with a key-lever shaft, of key-levers having springs for frictionally engaging with grooves or depressions in said shaft to hold them against lateral movement on said shaft, substantially as set forth.

23. In a cash-register, the combination with a key-lever shaft, of a key-lever stamped from sheet metal and having a projection struck from its body portion for engaging with a groove or depression in said shaft to hold the key-lever against lateral movement on said shaft, substantially as set forth.

24. In a cash-register, the combination with a key-lever shaft, of a key-lever stamped from sheet metal and having a spring struck from its body portion for producing friction between said key-lever and shaft, substantially as and for the purpose set forth.

25. A tablet-rod for cash-registers made from sheet metal, having a spring struck therefrom for moving a pawl or lever carried by the tablet-rod into engagement with a register-wheel, substantially as set forth.

26. A tablet-rod for cash-registers made from sheet metal, provided with a movable device adapted to be engaged by an actuating device and having a spring struck therefrom for holding said device normally out of the path of said actuating device, substantially as set forth.

27. A tablet-rod for cash-registers made from sheet metal and having a movable foot pivotally connected thereto by bending the upper part of said foot twice, each bend being substantially at a right angle, and passing part of same through a slot in the rod, and said rod having a spring struck from its body and acting against said foot to maintain it in its normal position, substantially as set forth.

28. A tablet-rod for cash-registers made from sheet metal and having a movable lever pivotally connected thereto and carrying pawls for operating register-wheels, said lever being pivoted to the rod by bending one end thereof twice, each bend being substantially at a right angle, and passing part of same through a slot in the rod, and said rod having a spring struck from its body and acting against said lever, substantially as set forth.

29. A tablet-rod for cash-registers consisting of a body stamped from sheet metal, a foot $b$ pivoted thereto, a part of said body being so cut and bent as to form a spring for said foot, a lever $g$ pivoted to said tablet-rod and provided with pawls for operating a register-wheel, and a part of said body being so cut and bent as to form a spring for said lever, substantially as set forth.

30. A tablet-rod for cash-registers made from sheet metal of substantially U shape in cross-section, provided with a movable device held normally out of the path of a lifting-rod by a spring struck from the back of the rod, a lug on either or both front edges of the rod with which a locking-bar engages to hold the tablet in an elevated position, and a lug struck from the upper end of the bar for supporting the rod in its normal position, substantially as set forth.

31. In a cash-register, the combination with a stationary till, of a movable cover therefor, a pin carried by said cover and a spring-drawn member arranged to be engaged by said pin so that the cover is held opened or drawn closed as the pin passes respectively from the dead-center position to one side of said dead-center position.

32. In a cash-register, the combination with a stationary till, of a rotary cover, a pin carried by the cover and movable to a dead-center position over the center of rotation, a lever coöperating with said pin and a spring exerting stress upon said lever, whereby the cover will be normally closed by the tension of the spring, but will be maintained in an open position when the pin is moved into said dead-center position, substantially as set forth.

33. In a cash-register, the combination with a series of indicators having projections on their stems, of a movable frame resting in engagement with said projections and arranged to be elevated by the operation of any one of the indicators and to return said indicator to its normal position.

34. In a cash-register, the combination with a series of indicators of a pivoted gravity-frame resting in engagement with said indicators and arranged to be elevated by the operation of any one of the indicators and to return all operated indicators to their normal positions.

35. In a cash-register, the combination with a shaft, a series of counter elements mounted thereon, an arm rigid with said shaft, a notched ring coacting with said arm to compel a longitudinal movement of the shaft before it can be rotated, and a spring-stop coöperating with said arm to arrest the same and yielding to continued rotation of said arm.

36. In a cash-register, the combination with a shaft, of a series of counter-wheels mounted on said shaft, means for locking said shaft against rotation until it is first moved longitudinally, and movable means independent of said shaft for locking the same from longitudinal movement.

37. In a cash-register, the combination with a casing having a lid, of a shaft mounted in said casing, a series of counter-wheels mounted on said shaft, means for locking said shaft against rotation until it is first moved longitudinally, and a lock operated by said lid for preventing the longitudinal movement of the shaft.

38. In a cash-register, the combination with an inclosing casing, of a register within said casing, turn-to-zero devices for said register, a lock for said turn-to-zero devices and a lid for the casing adapted by its movements to operate said lock.

39. In a register, the combination with a series of register-wheels, and turn-to-zero devices for said wheels, of a lock for said turn-to-zero devices, a guard for the register-wheels and means operated by the movement of said guard for operating the turn-to-zero lock.

40. In a cash-register, the combination with a series of registering elements, of keys arranged to set the same for operation, an actuator for moving said elements when so set, including pivoted levers, a till having a movable member carrying projections which engage said levers to operate them with a decreasing speed while the member sustains a constant speed.

41. In a cash-register, the combination with a registering mechanism including a common actuator, a till having a movable member, pivoted levers connected to the common actuator and projections on the movable till member engaging said levers to operate them with a decreasing speed while the member sustains a constant speed.

This specification signed and witnessed this 3d day of July, 1895.

FRANCIS C. OSBORN.

Witnesses:
 GEORGE MAITLAND,
 OTTO T. V. GEUTICH.